United States Patent
Li et al.

(10) Patent No.: US 9,841,959 B2
(45) Date of Patent: Dec. 12, 2017

(54) FINE-GRAINED DEMAND DRIVEN IPO INFRASTRUCTURE

(71) Applicant: GOOGLE INC., Mountain View, CA (US)

(72) Inventors: Xinliang David Li, Palo Alto, CA (US); Teresa Louise Johnson, Los Gatos, CA (US); Rong Xu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 23 days.

(21) Appl. No.: 14/634,401

(22) Filed: Feb. 27, 2015

(65) Prior Publication Data

US 2016/0224324 A1  Aug. 4, 2016

Related U.S. Application Data

(60) Provisional application No. 62/110,738, filed on Feb. 2, 2015.

(51) Int. Cl.
*G06F 9/45* (2006.01)
*G06F 9/445* (2006.01)

(52) U.S. Cl.
CPC ............ *G06F 8/443* (2013.01); *G06F 8/4443* (2013.01); *G06F 8/54* (2013.01)

(58) Field of Classification Search
CPC .......... G06F 8/443; G06F 8/445; G06F 8/447; G06F 8/4443; G06F 8/54

(Continued)

(56) References Cited

U.S. PATENT DOCUMENTS 5,375,242 A    12/1994  Kumar et al.
7,743,368 B2 *  6/2010  Das ....................... G06F 9/4431
                                              717/151

(Continued)

OTHER PUBLICATIONS

ISR & Written Opinion, dated May 11, 2016, in related application No. PCT/US2016/012938.

(Continued)

*Primary Examiner* — Anna Deng
(74) *Attorney, Agent, or Firm* — McDermott Will & Emery LLP (57) ABSTRACT

Provided are methods and systems for inter-procedural optimization (IPO). A new IPO architecture (referred to as "ThinLTO") is designed to address the weaknesses and limitations of existing IPO approaches, such as traditional Link Time Optimization (LTO) and Lightweight Inter-Procedural Optimization (LIPO), and become a new link-time-optimization standard. With ThinLTO, demand-driven and summary-based fine grain importing maximizes the potential of Cross-Module Optimization (CMO), which enables as much useful CMO as possible ThinLTO also provides for global indexing, which enables fast function importing; parallelizes some performance-critical but expensive inter-procedural analyses and transformations; utilizes demand-driven, lazy importing of debug information that minimizes memory consumption for the debug build; and allows easy integration of third-party distributed build systems. In addition, ThinLTO may also be implemented using an IPO server, thereby removing the need for the serial step.

13 Claims, 5 Drawing Sheets

(58) Field of Classification Search
USPC .......................................................... 717/151
See application file for complete search history.

(56) References Cited

U.S. PATENT DOCUMENTS

| | | | |
|---|---|---|---|
| 8,689,200 | B1 | 4/2014 | Tallam et al. |
| 8,806,463 | B1* | 8/2014 | Li .................. G06F 8/4443 717/151 |
| 2004/0068719 | A1* | 4/2004 | Liu .................. G06F 8/443 717/154 |
| 2011/0029805 | A1* | 2/2011 | Pericin ............ G06F 11/0715 714/2 |
| 2011/0088021 | A1* | 4/2011 | Kruglick .......... G06F 8/443 717/149 |
| 2013/0332474 | A1* | 12/2013 | Glaubman et al. ............ G06F 17/30312 707/755 |

OTHER PUBLICATIONS

"Link-Time Optimization in GCC: Requirements and High Level Design", GCC, the GNU Compiler Collection, Nov. 16, 2005, pp. 1-15.
"LIPO—Profile Feedback Based on Lightweight IPO", LightweightIpo—GCC Wiki, https//gcc.gnu.org/wiki/LightweightIpo, pp. 1-11, [retrieved Feb. 27, 2015].

* cited by examiner

FINE-GRAINED DEMAND DRIVEN IPO INFRASTRUCTURE

The present application claims priority to U.S. Provisional Patent Application Ser. No. 62/110,738, filed Feb. 2, 2015, the entire disclosure of which is hereby incorporated by reference.

BACKGROUND

Cross Module Optimization (CMO) (which is often implied by Interprocedural Optimization (IPO)) is one of the most effective ways to enable a compiler to optimize user programs. Traditionally, CMO is implemented using a technology called Link Time Optimization (LTO). LTO is a compilation model that enables cross-module optimizations and whole program analysis at link time (as the name suggests). However, LTO suffers from several limitations that make it unsuitable for use with very large applications. Such limitations include, for example: (1) LTO requires a huge amount of memory to perform the link step; (2) the link step is serial and greatly slows down the overall compilation; and (3) LTO cannot be easily integrated with large distributed build systems.

Other existing technology for implementing CMO is referred to as Lightweight IPO (LIPO), which is much more scalable than LTO. However, LIPO suffers from its own set of limitations and a ceiling has been reached in terms of it being possible to further improve LIPO's performance. Some examples of the issues associated with LIPO include: (1) LIPO requires profile feedback, and cannot be enabled by default; (2) LIPO is very intrusive to the build system (e.g., complex build system support is needed to deploy it); and (3) LIPO uses a coarse grain importing method that greatly limits the potential of CMO.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for source code compilation. More specifically, aspects of the present disclosure relate to a new architecture for implementing IPO.

As will be described in greater detail herein, the IPO architecture of the present disclosure is designed to scale to very large programs, has almost no limit in terms of the number of source modules it can handle, is extremely fast, and is targeted to be the default compilation mode (e.g., to be turned on by default). In addition, the IPO architecture described herein is designed to be friendly to both single machine parallel build and large distributed build system, and allows for very deep optimization with minimal overhead.

One embodiment of the present disclosure relates to a method for inter-procedural optimization comprising: generating, for each of a plurality of source code modules, an intermediate representation file; generating, for each of the plurality of source code modules, function indices and function summary data; storing, in separate sections of each intermediate representation file, the generated function indices and function summary data for the corresponding source code module; generating a thin-archive of the generated intermediate representation files with a combined function map; and performing cross-module optimization on the plurality of source code modules.

In another embodiment, performing the cross-module optimization in the method for inter-procedural optimization includes using the combined function map to perform fast function importing.

In another embodiment, performing the cross-module optimization in the method for inter-procedural optimization includes using demand-driven import of debug information from one or more other modules.

Another embodiment of the present disclosure relates to a computer-implemented method comprising performing cross-module optimization on a plurality of source code modules, where the cross-module optimization is parallel at the module granularity, uses a combined function map to perform fast function importing, and uses demand-driven import of debug information from other modules.

In another embodiment, the method further comprises generating, for each of the plurality of source code modules, an intermediate representation file.

In another embodiment, the method further comprises generating, for each of the plurality of source code modules, function indices and function summary data.

In yet another embodiment, the method further comprises: generating, for each of the plurality of source code modules, an intermediate representation file; generating, for each of the plurality of source code modules, function indices and function summary data; storing, in separate sections of each intermediate representation file, the generated function indices and function summary data for the corresponding source code module; and generating a thin-archive of the generated intermediate representation files with a combined function map.

Another embodiment of the present disclosure relates to a system for inter-procedural optimization comprising at least one processor and a non-transitory computer-readable medium coupled to the at least one processor having instructions stored thereon that, when executed by the at least one processor, causes the at least one processor to: generate, for each of a plurality of source code modules, an intermediate representation file; generate, for each of the plurality of source code modules, function indices and function summary data; store, in separate sections of each intermediate representation file, the generated function indices and function summary data for the corresponding source code module; generate a thin-archive of the generated intermediate representation files with a combined function map; and perform cross-module optimization on the plurality of source code modules.

In another embodiment, the at least one processor in the system for inter-procedural optimization is further caused to use the combined function map to perform fast function importing.

In yet another embodiment, the at least one processor in the system for inter-procedural optimization is further caused to use demand-driven import of debug information from one or more other modules.

Yet another embodiment of the present disclosure relates to a system comprising at least one processor and a non-transitory computer-readable medium coupled to the at least one processor having instructions stored thereon that, when executed by the at least one processor, causes the at least one processor to perform cross-module optimization on a plurality of source code modules, wherein the cross-module optimization is parallel at the module granularity, uses a combined function map to perform fast function importing, and uses demand-driven import of debug information from other modules.

In another embodiment, the at least one processor in the system is further caused to generate, for each of the plurality of source code modules, an intermediate representation file.

In yet another embodiment, the at least one processor in the system is further caused to generate, for each of the plurality of source code modules, function indices and function summary data.

In still another embodiment, the at least one processor in the system is further caused to: generate, for each of the plurality of source code modules, an intermediate representation file; generate, for each of the plurality of source code modules, function indices and function summary data; store, in separate sections of each intermediate representation file, the generated function indices and function summary data for the corresponding source code module; and generate a thin-archive of the generated intermediate representation files with a combined function map.

Embodiments of some or all of the processor and memory systems disclosed herein may also be configured to perform some or all of the method embodiments disclosed above. Embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

Cross Module Optimization (CMO) (which is often implied by Interprocedural Optimization (IPO)) is one of the most effective methods to enable a compiler to optimize user programs. By default, the compiler operates in the single module mode. In this mode, the compiler's ability to optimize is limited by the artificial source module boundaries established by the programmers.

Several existing mechanisms have been proposed to address this problem, including, for example, Link Time Optimization (LTO) and Lightweight Inter-Procedural Optimization (LIPO). However, such existing approaches suffer from limitations that make them unsuitable to be turned on by default. As will be described in greater detail below, the new CMO architecture of the present disclosure (which may sometimes be referred to herein as "ThinLTO") is designed to address the weaknesses and limitations of both LTO and LIPO, and become a new link-time-optimization standard.

There are numerous features of ThinLTO that provide a variety of advantages over existing approaches. For example, the methods and systems of the present disclosure resolve the CMO scalability issues that plague existing approaches for implementing CMO. ThinLTO also reduces the time spent in the serial (e.g., non-parallelizable, and thus a bottleneck) part of the compilation process to the bare minimum by default. The I/O operation is minimized as well since, for example, the second intermediate representation (IR) serialization may be eliminated. For example, with traditional CMO, after the inter-procedural analysis, in order for the transformations to happen in different partitions, the compiler is required to read-in IR files, make clones of functions that are needed by the transformation (e.g., inline transformation), and write the repartitioned IR back to disks. This serialization step is very I/O sensitive and is eliminated in the methods and systems presented herein.

With ThinLTO, demand-driven and summary-based fine grain importing maximizes the potential of CMO, which enables as much useful CMO as possible. ThinLTO also provides for global indexing, which enables fast function importing; parallelizes some performance-critical but expensive inter-procedural analyses and transformations; utilizes demand-driven, lazy importing of debug information that minimizes memory consumption for the debug build; and allows easy integration of third-party distributed build systems. In addition, ThinLTO may also be implemented using an IPO server, thereby removing the need for the serial step.

The new IPO (e.g., CMO) architecture of the present disclosure combines many of the optimal features of LIPO and traditional LTO, yet also includes fundamental changes and/or additions. While these fundamental changes/additions incorporated in ThinLTO provide many advantages over the existing approaches, there is still some similarity between certain concepts included in each. The following describes some examples of common terms that are used in the present disclosure.

Interprocedural optimization (IPO). IPO usually implies CMO, which means cross module optimization.

Primary module. A concept used in LIPO and ThinLTO. It is defined as a module where the out-of-line copy of a function defined inside will be emitted. Global variables defined in a primary module will also "own" storage in the data space.

Auxiliary module. A concept used in LIPO and ThinLTO. It is a module imported by a primary module. Function bodies defined in it will be discarded after CMO (inlining) except for a few exceptions.

Auxiliary function. A LIPO and ThinLTO concept. It is a function defined in an auxiliary module. Such functions have special linkages.

Function importing. A ThinLTO concept. It refers to the process to fast load the needed functions from other modules to the primary one.

Static promotion. A concept in LIPO, ThinLTO, and partition-based LTO. Static promotion refers to the process of promoting file static variables and functions to be external when a reference crosses module or partition boundary.

Thin-archive. An archive which contains a symbol index and references to the original copies of the member files of the archive. Thin archive avoids unnecessary copies of files in the local build system or in the remote cache. For example, when creating the archive/function map, no copies of the IR files are made. Instead, the archive simply references to the original IR files.

Intermediate Representation (IR). Intermediate program representation terms. It should be noted that intermediate representation may sometimes be referred to as intermediate language (IL). However, for the sake of clarity, in describing the various features and embodiments of the present disclosure, reference is made only to IR.

Linker plugin. A component used by traditional LTO and ThinLTO. A plugin is a loadable module to the real linker to handle intermediate files with formats that are not final relocatable objects.

In the following sections, conventional LTO and LIPO will first be described in detail in order to understand their shortcomings and limitations, and will be followed by a detailed description of ThinLTO in accordance with one or more embodiments of the present disclosure.

Conventional LTO

LTO is a compilation model that enables cross-module optimizations and whole program analysis at link time (as the name suggests). During regular compilation, instead of generating real relocatable object files, the compiler generates bitcode files with program IR (intermediate representations). These files are collected and merged at link time by the linker plugin. The compiler's IPA and code generator components are invoked by the plugin to generate real object files with CMO. The real object files are then passed to the real linker to generate the target executable or shared library.

There are several different variations of conventional (e.g., traditional, classic, etc.) LTO models, including, for example, the following:

(i) Full Monolithic Model: In this model, the LTO link phase does all the work without any parallelization. The work includes all IPA analysis and transformations, as well as function level optimizations and code generations. For example, LLVM's (which is a compiler infrastructure designed as a set of reusable libraries with well-defined interfaces) current LTO employs the full monolithic model. As another example, an older version of GCC's (GNU Compiler Collection) LTO also utilizes the full monolithic model when -fwhopr is not specified. A more recent version of GCC removes the -fwhopr option and makes whopr mode the default. The monolithic model can still be turned on in GCC with option -flto-partition=none.

(ii) Monolithic Model with Thread Level Parallelism: This model is similar to the full monolithic model described above in (i), with the main difference being that the function level optimization/code generation is done with thread level parallelism.

(iii) Serial IPO+Parallel BE: In this model, the LTO link step performs all IPA analysis and transformations (including inline transformation). After the serial step, process level parallel build will be invoked to perform optimization/code generation on the module level.

(iv) LTO with Partitioning: In this model, summary based IPA analysis is performed in the serial link step. IPA inlining may also be done with this model (the model only generates inlining decisions, but postpones transformations to later). After IPA analysis, call graph partitioning may be performed. The goal is to partition the call graph nodes into balanced subgraphs such that cross partition edge weight are minimized. Each partition is handled by a different subprocess to perform intraprocedural transformations and machine code generations. The subprocesses can be spawned concurrently. The size of a partition cannot be too large nor too small. If it is too large, the backend compilation of the large partition will have high memory pressure and the overall build time will be bottlenecked on it. On the other hand, if the partition is too small, the effect of CMO will be greatly reduced or serious serialization overhead will be incurred if cross partitioning node replication is done. For example, GCC's LTO uses such a model. The default mode is to perform balanced partitions. The number of partitions is dynamic, but by default it will be around an average of 32. Each partition should also be larger than a minimal size specified by a parameter.

With the exception of the fully monolithic model (i), described above, all of the other existing LTO models attempt to improve scalability by using some levels of parallelism. However, they are all designed for build with a single multicore machine in mind, which is not amenable to a large distributed build system. Besides, even with the best effort done by partition-based model, the compilation work done in the serial link step can still be significant.

One thing to note about thread level parallelism is that while it can speed up LTO compilation, it can also speed up the baseline compilation without LTO. For non-LTO compilation, the parsing cannot be easily parallelized, so using threading for non-LTO compilation may not be as effective. Non-LTO compiles also usually use process level parallelism. Therefore, adding thread level parallelism blindly can overload the system.

Regardless of whether -g is specified or not, GCC's IR carries the overhead of all the type information. This is one of the reasons GCC's IR size is much larger than LLVM's.

However, with -g, LLVM IR size can be 10× larger than without, which will be a significant limiting factor for building large apps in monolithic mode or with large partitions.

It is worth noting that conventional LTO technology has been in use for quite a while. Early compilers used a monolithic component called pre-linker to perform cross-module optimizations. The pre-linker produces a combined .o file that is then fed to the real linker to generate the final executable/shared library. The early year LLVM implemented LTO in the same way.

Early existing compilers that first implemented scalable LTO introduced two innovations. One innovation is linker plugin, and the other is the fully-parallel backend. The introduction of linker plugin allows LTO to be integrated with existing build systems seamlessly with minimal change. It also enables whole program features that require real linker's feedback. Except for the plugin change, LLVM's LTO still remains monolithic after more than ten years of evolution (there was a recent effort to do GCC type partitioning in LLVM).

Lightweight IPO (LIPO)

LIPO stands for Lightweight IPO. LIPO is a cross-module optimization technology that is tightly coupled with Feedback-Directed Optimization (FDO) and is based on the observation that LTO requires profile feedback in order to be effective. In this compilation model, program instrumentation run is augmented with one additional step: lightweight dynamic IPA (dyn-ipa). In this additional step, a coarse grain inline analysis is performed based on dynamic call graph built from direct and indirect call profile counters, and the results of the analysis are recorded in the profile data as module groups.

With LIPO, in the optimize build (profile-use pass) there is no serial link plugin step, as done in conventional LTO. In the LIPO model, one source module can be included as so-called auxiliary module in multiple module groups. As a result, the profile-use compilation is fully parallelizable as any regular O2 build. It also works naturally with any distributed build system to fully explore the build parallelism. LIPO can be used with full debug info turned on, which is important for production binaries built with peak optimizations.

Limitations of LIPO

Existing LIPO technology is subject to several limitations and complications including, for example, the following:

(i) LIPO is limited to build with profile feedback only (although LTO may be more effective when used with FDO);

(ii) The parser based multiple module compilation cannot deal with interlanguage grouping;

(iii) Parser based multi-module compilation is complex and tricky (e.g., to isolate parsing context) to implement;

(iv) Module grouping size is limited due to memory constraints. For large C++ programs, it is not uncommon for a C++ module to contain thousands of functions. It is quite hard for LIPO dyn-ipa pass, which does coarse grain inline analysis and module grouping, to come up with an optimal heuristic to select the best aux module given the constraint. A slight difference in module grouping can also result in non-trivial performance swings;

(v) A distributed build system needs to be taught about the additional source dependencies introduced by LIPO in order to send the right set of files to the build nodes;

(vi) For legacy makefiles, the newly introduced dependency on a generated source file can lead to build errors; and (vii) Needs more distributed build frontend support in order to work with stale profiles.

Overview of ThinLTO

As described above, both conventional LTO and LIPO suffer from various limitations and are not suitable for out of the box/general use. Accordingly, embodiments of the present disclosure provide a new LTO mechanism ("ThinLTO") to overcome the limitations and issues associated with conventional LTO and LIPO. As will be described in greater detail below, ThinLTO is designed to maintain many optimal parts of LIPO with the same principles, but without any of LIPO's inherent weaknesses. Unlike in LIPO where the module group decision is made at training runtime, ThinLTO makes the decision at compile time, but in a lazy mode that facilitates large scale parallelism. With ThinLTO, the serial linker plugin phase is designed to be extremely thin and fast. Also, in accordance with at least one embodiment, by default this step only does minimal preparation work to enable the parallel lazy importing performed later.

ThinLTO Design Objectives and Characteristics

In accordance with one or more embodiments described herein, the cross-module optimization methods, systems, and architectures of the present disclosure are designed based on one or more of the following objectives and characteristics:

(i) ThinLTO may operate without relying on profile feedback.

(ii) By default, ThinLTO is designed to be lean and mean, and does not rely on machines with large memory configuration. ThinLTO may be as easy to use and as scalable as regular O2.

(iii) The serial part of LTO is as thin as possible (per Amdahl's law) to make massive parallelism effective. This means, for example, that anything not strictly needed in this step may be pruned by default. IO operations may be minimal, and most computations may be delayed to the parallel stage.

(iv) ThinLTO is designed to maximize cross module inlining benefit with minimal memory and compile time overhead. Summary based whole program analyses with different costs can be optionally turned on with additional flags or higher optimization levels.

(v) With profile-feedback turned on, the serial step can be completely eliminated.

(vi) Parallelization granularity may be kept at source module level and on-demand importing granularity kept at function level. For distributed build, granularity should not be too large (e.g., lower parallelism) or too small (e.g., high setup cost, lack of import sharing, code duplication cost, etc.).

(vii) ThinLTO is designed to be friendly to both single machine parallel build and large scale distributed build.

(viii) ThinLTO enables simple compile time and runtime bug triaging and debugging (e.g., allows easy mix and match of non-LTO object files).

In accordance with at least one embodiment, similar to conventional LTO build, ThinLTO is a 3-phase compilation (except for ThinLTO+FDO, which can be simplified to 1-phase, as will be described in greater detail below). However, the tasks performed at each phase in ThinLTO are different from those performed at each stage in conventional LTO. In comparison to conventional LTO, the design of ThinLTO liberates the parallelism and improves overall scalability.

The following sections provide additional details about the basic design of ThinLTO (e.g., for single machine build), and also describe a couple of variants of ThinLTO that may be targeted for different scenarios including, for example, distributed build, FDO, etc.

ThinLTO for Single Machine Parallel Build

Figure 1:
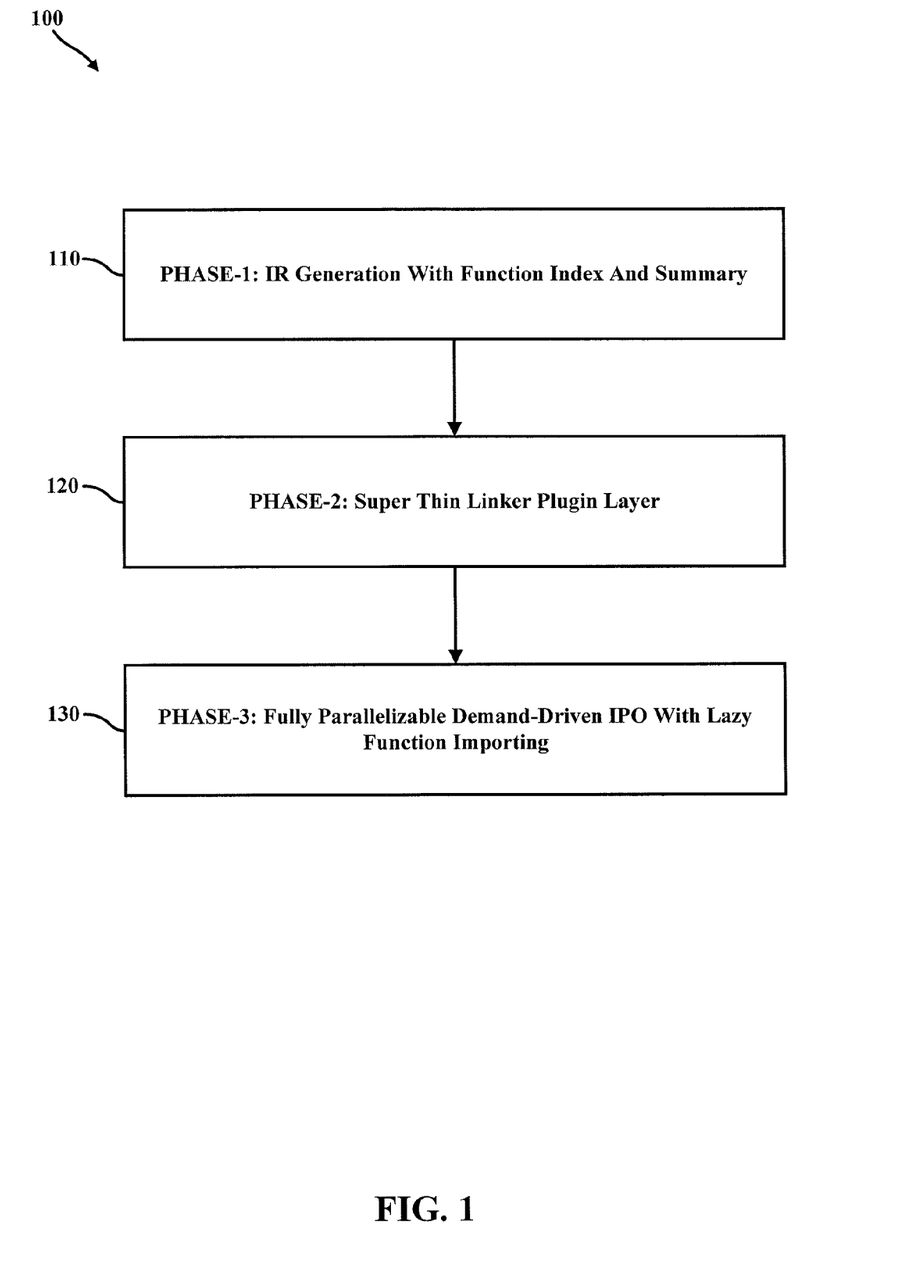
FIG. 1 is a flow diagram illustrating example phases in an IPO system according to one or more embodiments described herein.

FIG. 1 illustrates an example three-phase compilation 100 in ThinLTO, in accordance with one or more embodiments described herein. Each of the phases illustrated in FIG. 1 will be described in greater detail below.

Phase-1: IR Generation with Function Index and Summary

In accordance with one or more embodiments of the present disclosure, in the first phase (e.g., 110 in the example compilation 100 shown in FIG. 1) the compiler may produce IR bitcode files instead of real relocatable objects. In addition, the compiler may also generate the following and store them in separate sections of the IR file:

(1) Function body indices. It is basically the function symbol table that maps from function ids to their body offsets in the IR file. This allows for fast retrieving and lazy importing at a later time.

(2) Function summary data. The summary data is used to assist function importing decisions done in phase-3 compilation. The function summary data may include, but is not limited to, the following: (a) core function attributes such as size, pro/epilogue cost, number of branches, has malloc call, etc.; and (b) transfer functions (if there are any), where a transfer function maps parameter value/value ranges to potential cost savings after inlining.

Figure 2:
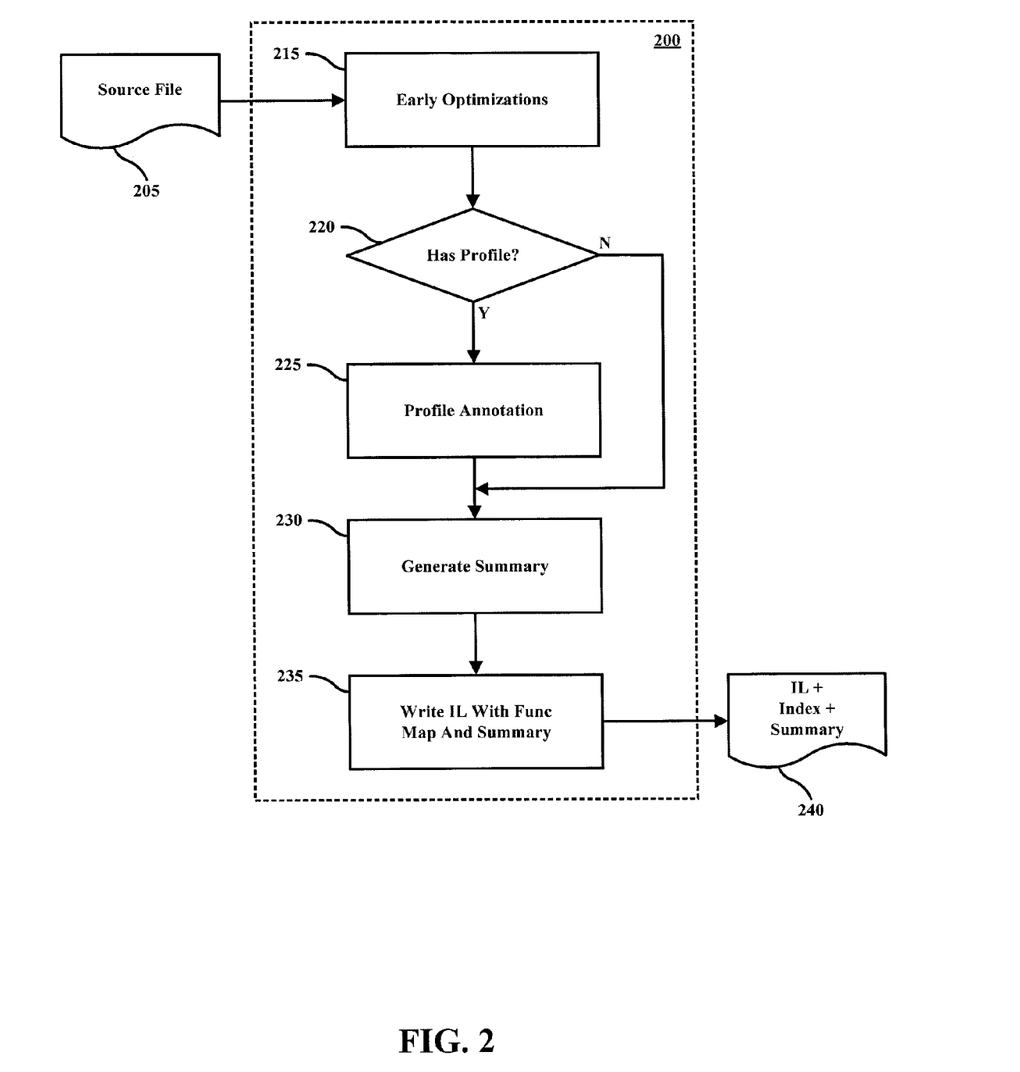
FIG. 2 is a flowchart illustrating an example IR generation process according to one or more embodiments described herein.

FIG. 2 illustrates an example compilation pipeline 200 for phase-1 of a cross module optimization method, system, and architecture, in accordance with one or more embodiments described herein. An example phase-1 compiler command line may be:

${CC} -O2 -c -fthin-lto -o source.o source.cc

Phase-2: A Super Thin Linker Plugin Layer

In accordance with at least one embodiment of the present disclosure, by default, only a minimal amount of work may be done in the second phase of ThinLTO (e.g., 120 in the example compilation 100 shown in FIG. 1). In ThinLTO, the plugin only needs to generate a thin-archive of the generated IR files from phase-1 with a combined function map. As such, the memory usage will be very small and I/O will be minimized. In addition, the following example techniques can be performed to reduce the total function index size:

(1) "COMDAT" elimination. For example, picking only one of the comdat copy in the final index. In a scenario where profile data exists, the out of line copy may be picked.

(2) Skip all unlikely/cold functions (e.g., marked by user or profile data), if they cannot bring other benefits either (e.g., size reduction). It should be noted that unless callsite info is available to make more precise estimates, this technique should probably be limited to very small functions).

(3) Skip very large functions with no good inlining benefit.

In accordance with at least one embodiment, more heavyweight summary based IPA passes can optionally be performed. However, such passes may not be turned on by default. The design details of such additional passes is beyond the scope of the present disclosure.

With the default ThinLTO mode, the linker plugin step is essentially a synchronization point for phase-1, after which phase-3 can start sharing IRs. It should be noted that it may be possible to get rid of the synchronization step completely. One example of how this may be achieved is by a build server that pre-computes the IRs continuously. With that, the compiler build can simply fetch the function body from the database. If it is missing, an on-demand request can be made to the build server.

At the end of phase-2, the plugin will invoke the backend driver in parallel. For each backend driver invocation, it will pass an unmodified IR file from phase-1 as well as the thin-archive file with the composite function body index. An example command line to invoke the linker plugin may be:

${CC} -fthin-lto=./${some_dir}/prog_thin_arch.a source1.o source2.o . . . -o a.out In the above example command line, sourcex.o files are IR files with function map and summary data produced in phase-1. The linker plugin will produce prog_thin_arch.a file in phase-2. In a scenario where heavyweight IPA passes are turned on, the IPA analysis result may also be stored in the archive file.

The following is an example parallel backend driver invocation command line by ld plugin:

${BE_DRIVER} -fthin-lto-use=./${some_dir}/prog_thin_arch.a source1.o -o source1_real.o . . . .

Additional details about what happens with this example command line are provided below.

Phase-3: Fully Parallelizable Demand-Driven IPO with Lazy Function Importing

Figure 3:
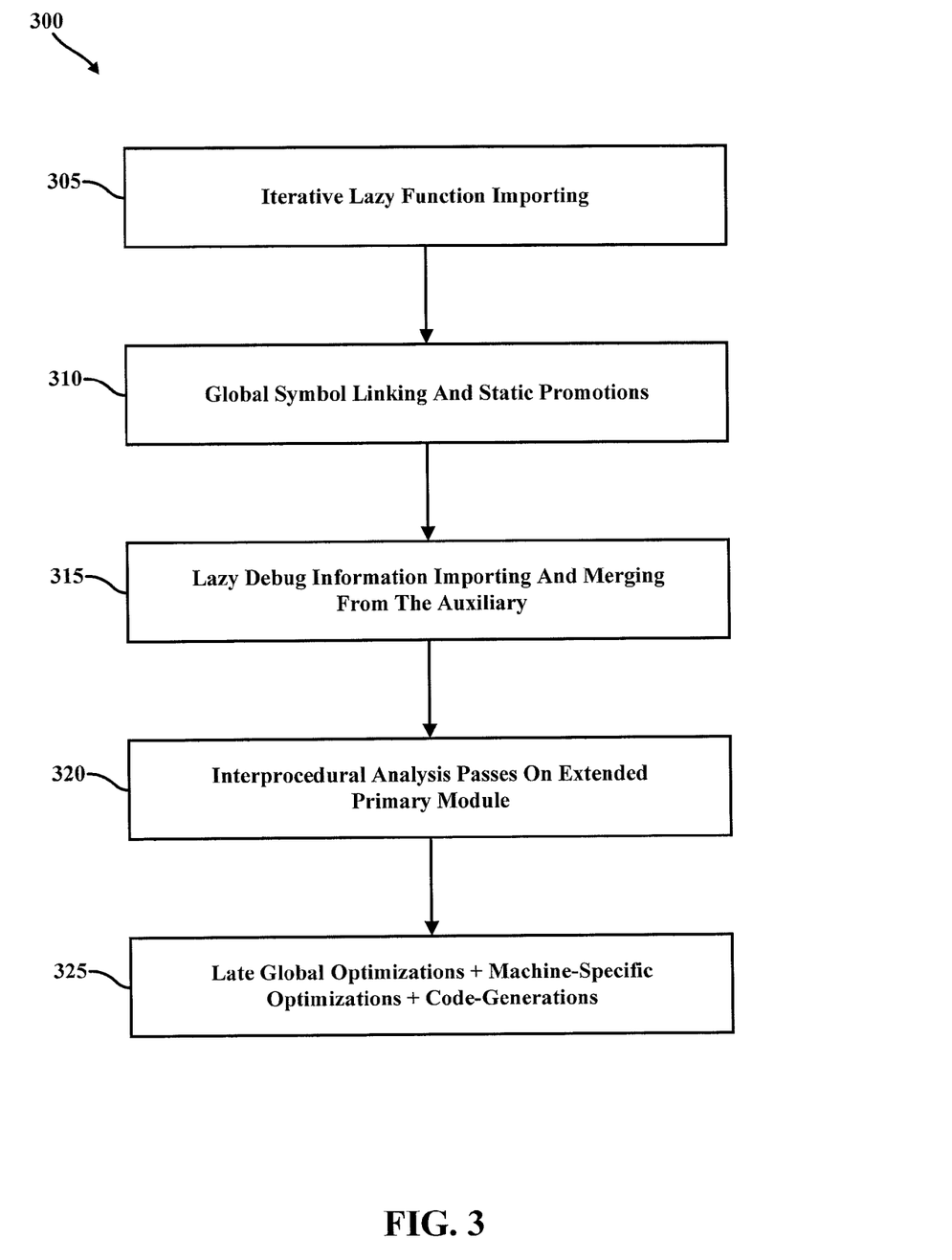
FIG. 3 is a flowchart illustrating an example IPO process with lazy function importing according to one or more embodiments described herein.

In accordance with one or more embodiments of the present disclosure, the compilation pipeline in the third phase of ThinLTO (e.g., 130 in the example compilation 100 shown in FIG. 1) may include the example blocks illustrated in FIG. 3.

Figure 4:
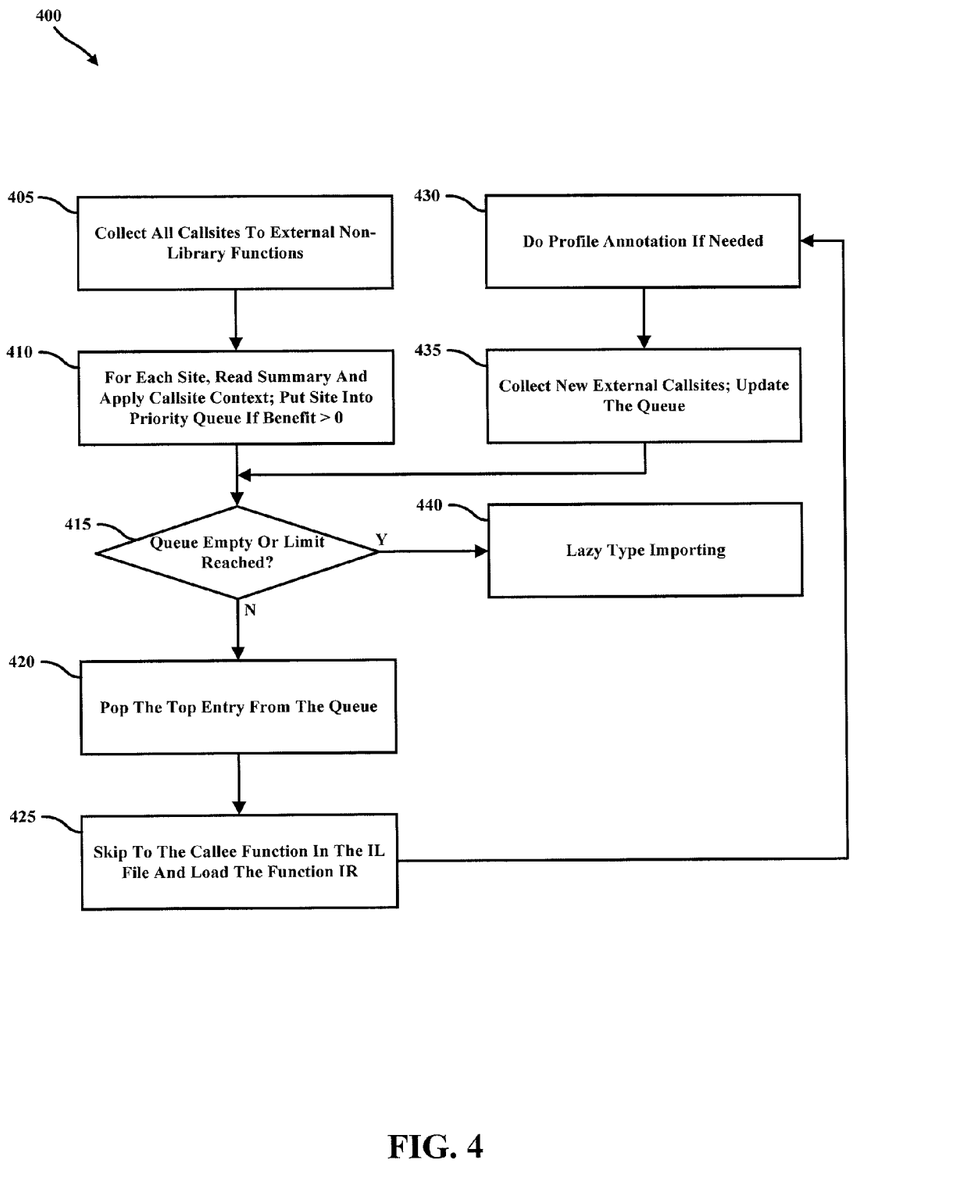
FIG. 4 is a flowchart illustrating an example method for iterative lazy function importing according to one or more embodiments described herein.

Block 305 in the third phase 300 of ThinLTO may include iterative lazy function importing. In this step, additional details of which are illustrated in FIG. 4, only likely needed auxiliary functions from auxiliary modules in the thin-archive are imported to the primary module. It should be noted that this is different from LIPO, where all functions in an auxiliary module are forced to be imported at the same time. Further details about the iterative lazy function importing that may be performed at block 305 are provided below with respect to FIG. 4.

FIG. 4 illustrates an example process 400 for iterative lazy function importing in accordance with one or more embodiments described herein.

At block 405, all callsites to external non-library functions in the module may be determined (e.g., identified, located, etc.).

At block 410, for each of the callsites determined at block 405, the function summary data for the callsite may be read and a determination made as to the estimated importing benefit. In accordance with at least one embodiment of the present disclosure, if importing the site is determined to be beneficial (e.g., the estimated importing benefit determined for the site is >0), the site may be placed in a priority queue.

At block 415, a determination may be made as to whether the priority queue is empty or a limit for the priority queue has been reached.

If it is determined at block 415 that the priority queue is empty or that a limit for the priority queue has been reached, then function importing is complete and the process may move to block 440.

At block 440, once iterative function importing has been completed (e.g., as determined at block 415), type information for the imported functions may be lazily imported.

On the other hand, if it is determined at block 415 that the priority queue is not empty and that a limit for the priority queue has not been reached, then the iterative process may continue at block 420, where the top entry from the priority queue may be popped.

At block 425, the function's entry in the global function index may be used to locate and load the function's IR in the corresponding module.

At block 430, if a profile exists for the function and the profile is not already in the loaded function IR, the profile may be annotated onto the function IR loaded at block 425.

At block 435, new non-library external callsites may be collected (e.g., obtained, determined, etc.) from the function IR loaded at block 425. If any of the new non-library external callsites are determined to be beneficial to import (e.g., based on the callsite's function summary and callsite analysis), they may be added to the priority queue.

Returning to the example process 300 illustrated in FIG. 3, block 310 may include global symbol linking (cross module) and static promotions. Cold modules explicitly marked as "not-imported" do not need to do so.

Block 315 may include lazy debug information importing and merging from the auxiliary. In this step, only debug DIEs (or their meta data) needed by the imported functions are merged (e.g., unified) into the primary module. It should be noted that in accordance with one or more embodiments of the present disclosure, either or both of block 310 (global symbol linking and static promotion) and block 315 (debug importing) may be performed iteratively during the third phase 300 (function importing) of ThinLTO.

Block 320 may include Interprocedural Analysis Passes on the extended primary module.

Block 325 in the third phase 300 of ThinLTO may include late global optimizations, machine-specific optimizations, and code-generations.

It should be understood that all functions that imported from other modules are auxiliary functions as defined in accordance with LIPO. They can be safely discarded after inline transformation except for cases when the copy becomes local or is not guaranteed to be defined by other modules.

ThinLTO Lazy Debug Info Importing

Debug information consumes lots of memory, and it can be expensive to unify/merge lots of types. If a primary module imports N functions from M different modules, it can be prohibitively expensive to import debug info from all M modules. In accordance with one or more embodiments of the present disclosure, one way to handle this issue is by importing debug info entries in a demand driven fashion. Such an approach may include, for example, an IR walk for each imported function, computing the set of transitively referenced debug info entities, and merging them into the primary module.

Split Phase-2 and Phase-3 Build into Two Passes

To exploit build parallelism, phase-1 compilation is usually done in its own pass (e.g., via compiler option -c and independent build actions per source file). However, in accordance with at least one embodiment of the present disclosure, by default, the phase-2 and phase-3 steps of ThinLTO may be done in a merged pass, with the linker plugin driving the parallel build of the backend actions.

For ThinLTO, a different build mode also exists: In the linker plugin step, after the thin-archive file is created, the linker plugin can choose to create a backend action file (e.g., usually a GNU makefile) and stop instead of resuming compilation by involving the backend drivers. The user can then invoke "make" with the generated makefile directly. For example:

Pass 1:
${CC} -fthin-lto -c source1.cc
${CC} -fthin-lto -c source2.cc
Pass 2: # (generate generated.mk and stop without invoking BE)
${CC} -fthin-lto=./thin_arch.a -fthin-lto-twopass=./generated.mk source1.cc source2.c Pass 3: # (explicitly invoked by the user)
make -j10 -f ./generated.mk The mode described above gives the user the flexibility to integrate ThinLTO build easily with their customized build system for remote compilations.

ThinLTO for Distributed Build Systems

In accordance with at least one embodiment of the present disclosure, phase-1 ThinLTO may be fully subject to the full parallelism offered by any distributed build system. Although linker plugin is a serial step, ThinLTO shrinks it to the bare minimum. However, during the more expensive step of the build, phase-3 (e.g., linker plugin) needs to work with any distributed build system without embedding the build system specific knowledge into the compiler proper.

With the ThinLTO design and architecture of the present disclosure, this problem can be easily resolved. For example, the 2-pass compilation described above can be used to resolve this issue. After the makefile is generated by the linker plugin, a build system specific conversion tool can be used to convert the makefile into the target build file format. This build file can then be fed to the distributed build frontend to execute.

Build with Profile Feedback (FDO/AFDO)

ThinLTO works transparently with Automatic Feedback-Directed Optimization (AFDO), even with stale profiles. With Instrumentation-based FDO, profile-use compilation with ThinLTO can be degenerated into a single-phase compilation just like a regular O2 or LIPO build. The idea is that thin archive can be generated in profile-gen pass and reused in profile-use step.

It should be noted that, in accordance with one or more of the embodiments described herein, for ThinLTO with profile feedback, module level summary can eliminate the need to do function importing for a large percentage of cold modules. The function level importing can also be more selective and faster with profile guidance.

In accordance with at least one embodiment of the present disclosure, the following describes an example of one possible alternative design for an IPO infrastructure that can achieve similar effectiveness in cross-module inlining as ThinLTO.

(1) In the linker plugin step, the LIPO style coarse grain inline analysis is performed. The inline analysis is based on summary data (e.g., mainly callgraph);

(2) Instead of making full blown inline decisions (e.g., as done in GCC), this pass only decides what grouping needs to be done to enable useful CMO;

(3) The functions may be partitioned based on original source module boundaries;

(4) Functions needed to enable CM inlining may be cloned into the target source module based on the inline analysis above. The function cloning is essentially auxiliary function importing in ThinLTO, but done in the Linker Plugin stage.

As compared with ThinLTO, the example alternative design described above has a few disadvantages including, for example, the following:

(i) Inline analysis is added in the bottleneck of the compilation pipeline, thereby reducing the maximum possible speed factor with parallelization;

(ii) Auxiliary function importing step is also added to the serialization step. Even though thread level parallelism can be applied, it is limited to a single machine;

(iii) The size of the summary data is still linear to the program size, and thus may reach build machine limit at some point in the future;

(iv) Debug information handling problems. To support lazy/on-demand debug type importing, the compiler needs to walk through IR of most modules in the serialized step.

Figure 5:
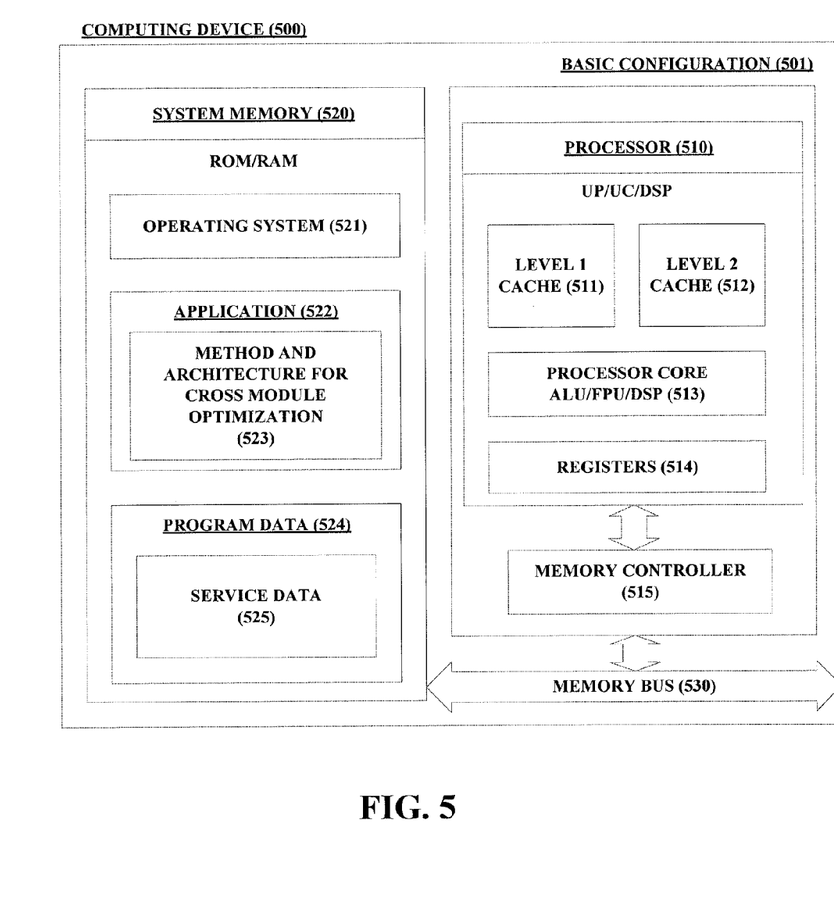
FIG. 5 is a block diagram illustrating an example computing device arranged for creating cross module optimizations according to one or more embodiments described herein.

FIG. 5 is a high-level block diagram of an exemplary computer (500) that is arranged for creating cross module optimizations in accordance with one or more embodiments described herein. In a very basic configuration (501), the computing device (500) typically includes one or more processors (510) and system memory (520). A memory bus (530) can be used for communicating between the processor (510) and the system memory (520).

Depending on the desired configuration, the processor (510) can be of any type including but not limited to a microprocessor (µP), a microcontroller (µC), a digital signal processor (DSP), or any combination thereof. The processor (510) can include one more levels of caching, such as a level one cache (511) and a level two cache (512), a processor core (513), and registers (514). The processor core (513) can include an arithmetic logic unit (ALU), a floating point unit (FPU), a digital signal processing core (DSP Core), or any combination thereof. A memory controller (516) can also be used with the processor (510), or in some implementations the memory controller (515) can be an internal part of the processor (510).

Depending on the desired configuration, the system memory (520) can be of any type including but not limited to volatile memory (such as RAM), non-volatile memory (such as ROM, flash memory, etc.) or any combination thereof. System memory (520) typically includes an operating system (521), one or more applications (522), and program data (524). The application (522) may include a method and architecture (523) for creating cross module optimizations for the application. Program Data (524) may include storing instructions that, when executed by the one or more processing devices, implement a method and architecture for code optimizations (523). In accordance with at least some embodiments, the application (522) can be arranged to operate with program data (524) on an operating system (521).

The computing device (500) can have additional features or functionality, and additional interfaces to facilitate communications between the basic configuration (501) and any required devices and interfaces.

System memory (520) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of the device (500).

The computing device (500) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (500) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for inter-procedural optimization comprising:
generating, by a processor, for each of a plurality of source code modules, an intermediate representation file;
generating, by the processor, for each of the plurality of source code modules, function indices and function summary data, wherein each function index comprises a function symbol table that maps function IDs to function body offsets in the intermediate representation file;
storing, by the processor, in separate sections of each intermediate representation file, the generated function indices and function summary data for the corresponding source code module;
generating, by the processor, for the plurality of source code modules, a thin-archive corresponding to the generated intermediate representation files, wherein the generated thin-archive includes a combined function map and references to the generated intermediate representation files while lacking copies of the generated intermediate representation files; and performing, by the processor, cross-module optimization on the plurality of source code modules using the corresponding thin-archive.

2. The method of claim 1, wherein the cross-module optimization is parallel at the module granularity.

3. The method of claim 1, wherein performing the cross-module optimization includes:

using the combined function map to perform fast function importing.

4. The method of claim 1, wherein performing the cross-module optimization includes:

using demand-driven import of debug information from one or more other modules.

5. The method of claim 1, wherein the thin-archive is generated using a linker plugin invocation command, wherein the linker plugin invocation command specifies the generated intermediate representation files to be included as references in the thin-archive.

6. A system for inter-procedural optimization comprising:
at least one processor; and
a non-transitory computer-readable medium coupled to the at least one processor having instructions stored thereon that, when executed by the at least one processor, causes the at least one processor to:
generate, for each of a plurality of source code modules, an intermediate representation file;
generate, for each of the plurality of source code modules, function indices and function summary data, wherein each function index comprises a function symbol table that maps function IDs to function body offsets in the intermediate representation file;
store, in separate sections of each intermediate representation file, the generated function indices and function summary data for the corresponding source code module;
generate, for the plurality of source code modules, a thin-archive corresponding to the generated intermediate representation files, wherein the generated thin-archive includes a combined function map, and references to the generated intermediate representation files while lacking copies of the generated intermediate representation files; and
perform cross-module optimization on the plurality of source code modules using the corresponding thin-archive.

7. The system of claim 6, wherein the cross-module optimization is parallel at the module granularity.

8. The system of claim 6, wherein the at least one processor is further caused to:
use the combined function map to perform fast function importing.

9. The system of claim 6, wherein the at least one processor is further caused to:
use demand-driven import of debug information from one or more other modules.

10. One or more non-transitory computer readable media storing computer-executable instructions that, when executed by one or more processors, causes the one or more processors to perform operations comprising:
generating, for each of a plurality of source code modules, an intermediate representation file;
generating, for each of the plurality of source code modules, function indices and function summary data, wherein each function index comprises a function symbol table that maps function IDs to function body offsets in the intermediate representation file;
storing, in separate sections of each intermediate representation file, the generated function indices and function summary data for the corresponding source code module;
generating, for the plurality of source code modules, a thin-archive corresponding to the generated intermediate representation files, wherein the generated thin-archive includes a combined function map and references to the generated intermediate representation files while lacking copies of the generated intermediate representation files; and
performing cross-module optimization on the plurality of source code modules using the corresponding thin-archive.

11. The one or more non-transitory computer readable media of claim 10, wherein the cross-module optimization is parallel at the module granularity.

12. The one or more non-transitory computer readable media of claim 10, wherein the computer-executable instructions, when executed by the one or more processors, causes the one or more processors to perform further operations comprising:
using the combined function map to perform fast function importing.

13. The one or more non-transitory computer readable media of claim 10, wherein the computer-executable instructions, when executed by the one or more processors, causes the one or more processors to perform further operations comprising:
using demand-driven import of debug information from one or more other modules.

* * * * *